United States Patent [19]
Fukawa

[11] Patent Number: 5,293,418
[45] Date of Patent: Mar. 8, 1994

[54] MOBILE TERMINAL EQUIPMENT CAPABLE OF STORING CALLED STATE

[75] Inventor: Yasurou Fukawa, Hiratuka, Japan

[73] Assignee: ANY Co., Ltd., Kanagawa, Japan

[21] Appl. No.: 716,119

[22] Filed: Jun. 17, 1991

[30] Foreign Application Priority Data

Jun. 20, 1990 [JP] Japan .................. 2-159857
Apr. 16, 1991 [JP] Japan .................. 3-109651

[51] Int. Cl.⁵ .................. H04M 11/00; H04M 1/64
[52] U.S. Cl. .................. 379/58; 379/57; 379/59; 379/67; 379/88
[58] Field of Search .................. 379/57, 58, 59, 67, 379/88

[56]  References Cited
U.S. PATENT DOCUMENTS

| | | | |
|---|---|---|---|
| 3,564,150 | 6/1968 | Mulley | 379/63 |
| 3,575,558 | 7/1968 | Leyburn et al. | 379/57 |
| 3,899,772 | 8/1975 | Mead et al. | 455/54.1 |
| 4,072,824 | 2/1978 | Phillips | 379/57 |
| 4,408,099 | 10/1983 | Ishii | 379/57 |
| 4,747,122 | 5/1988 | Bhagat et al. | 379/57 |
| 4,794,638 | 12/1988 | Millett | 379/88 |
| 4,821,308 | 4/1989 | Hashimoto | 379/57 |
| 4,910,794 | 3/1990 | Mahany | 370/84 |
| 5,111,197 | 5/1992 | Ichikawa | 379/57 |
| 5,128,980 | 7/1992 | Choi | 379/57 |
| 5,128,981 | 7/1992 | Tsukamoto et al. | 379/61 |
| 5,142,279 | 8/1992 | Jasinski et al. | 379/63 |

Primary Examiner—Curtis Kuntz
Assistant Examiner—Vijay Shankar

[57]  ABSTRACT

Mobile terminal equipment communicable with a public switched network has a receiving section for receiving information over a radio channel from a radio station which is accommodated in the public switched network, a storage for storing the information received by the receiving section, an indicating section for indiating the information stored in the storage, and a controller connected to the receiving section, storage and indicating section. The controller controls the storage in response to the reception of the information by the receiving section such that the storage stores the information while the indicating section indicates the information.

24 Claims, 3 Drawing Sheets

MOBILE TERMINAL EQUIPMENT CAPABLE OF STORING CALLED STATE

BACKGROUND OF THE INVENTION

1. Field of the Invention

The present invention relates to a communication system which allows remote mobile terminal equipment to call and interchange information with each other via a public switched telephone network, paging station, radio link controller, etc. The present invention is also concerned with terminal equipment applicable to such a comunication system.

2. Description of the Prior Art

In one of conventional mobile communication systems, a personal computer or similar information transmitting center calls radio terminal equipment having a receiving capability only via a public switched telephone network and a radio paging station and then sends desired information to the terminal equipment. The personal computer, for example, is installed in an office or similar facility while the terminal equipment is carried by a staffer belonging to the office. The staffer, therefore, can receive information from the office at any place outside the office. However, the problem with this system is that it is only the fixed center that can send information, i.e., such terminal equipment located outside the office cannot send information to another terminal equipment also located outside the office. More specifically, it is only the fixed center that can transmit call indication information.

Another conventional mobile communication system allows two remote radio terminal equipment, or mobile stations, to communicate with each other via a radio base station. In this kind of system, a radio base station is connected to a public switched telephone network via a central office. A mobile station intending to send information to a remote mobile station transmits an originating call signal. In response, the radio base station designates a particular communication channel and then checks the mobile station. When the communication channel is set up, the calling mobile station sends a dial number designating the mobile station to be called. The central office sends a calling signal to the called mobile station on the basis of the dial number. Then, the called station returns an answer signal, and the base station selects a communication channel. In this condition, the remote two mobile stations can start communication with each other over the designated communication channel. However, when the poerson expected to handle the called mobile station is absent or has suppressed the output of ringing, information cannot be delivered from the calling mobile station to the called mobile station despite the ringing from the calling station. Specifically, this conventional communication system does not take account of the fact that when the calling person sends information to a called mobile station, the called person may have left the called mobile station or intentionally switched off the mobile station or may not answer the call for one reason or another.

SUMMARY OF THE INVENTION

It is therefore an object of the present invention to provide relatively simple and miniature mobile terminal equipment which is ready to receive call indication information at all times.

In accordance with the present invention, mobile terminal equipment communicable with a public switched network comprises a receiving section for receiving information over a radio channel from a radio station accommodated in the public switched network, a storage for storing the information received by the receiving section, an indicating section for indicating the information stored in the storage, and a controller connected to the receiving section, storage, and indicating section. The controller controls the storage in response to the reception of the information by the receiving section such that the storage stores the information while the indicating section indicates the information.

Also, in accordance with the present invention, mobile terminal equipment communicable with a public switched network comprises an inputting section for inputting communication information to be transmitted and identification (ID) information designating particular terminal equipment to be called, a transmitting section for transmitting communication information and ID information to the public switched network, a receiving section for receiving information from the public switched network, a storage for storing communication information and information received by the receiving section, an indicating section for indicating information stored in the storage, and a controller connected to the inputting section, transmitting section, receiving section, storage, and indicating section. The controller is responsive to the inputting section for controlling the transmitting section to transmit ID information and communication information. Further, the controller controls, when the receiving section receives information, the storage to store the received information while causing the indicating section to indicate the stored information. In addition, the controller controls, when the receiving section receives information indicating that the connection to terminal equipment associated with ID information has failed, the transmitting section to transmit ID information and transmit communication information thereafter.

Further, in accordance with the present invention, a mobile communication method for communicating with mobile terminal equipment via a public switched network comprises the steps of preparing first mobile terminal equipment, inputting in the first mobile terminal equipment communication information to be transmitted and ID information designating second mobile terminal equipment, transmitting the communication information and ID information from the first mobile terminal equipment to the public switched network, calling the second mobile terminal equipment by the public switched network on the basis of the ID information, transmitting the communication information from the public switched network to the second mobile terminal equipment, storing the communication information in a storage included in the second mobile terminal equipment, and indicating the stored information by an indicating section included in the second mobile terminal equipment.

Moreover, in accordance with the present invention, a mobile communication method for communicating with mobile terminal equipment via a public switched network comprises preparing first mobile terminal equipment, preparing a mobile telephone in associated with the first mobile terminal equipment, inputting in the first mobile terminal equipment communication information to be sent and ID information designating second mobile terminal equipment, originating a call meant for the second mobile terminal equipment on the mobile telephone to the public switch network, transmitting, on the reception of information indicating that the connection to the second mobile terminal equipment has failed from the public switched network, communication information and ID information from the first mobile terminal equipment to the public switched network, calling the second mobile terminal equipment by the public switched network on the basis of said ID information, sending communication information from the public switched network to the second mobile terminal equipment, storing received information in a storage included in the second mobile terminal equipment, and indicating the stored information by an indicating section included in the second mobile terminal equipment.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
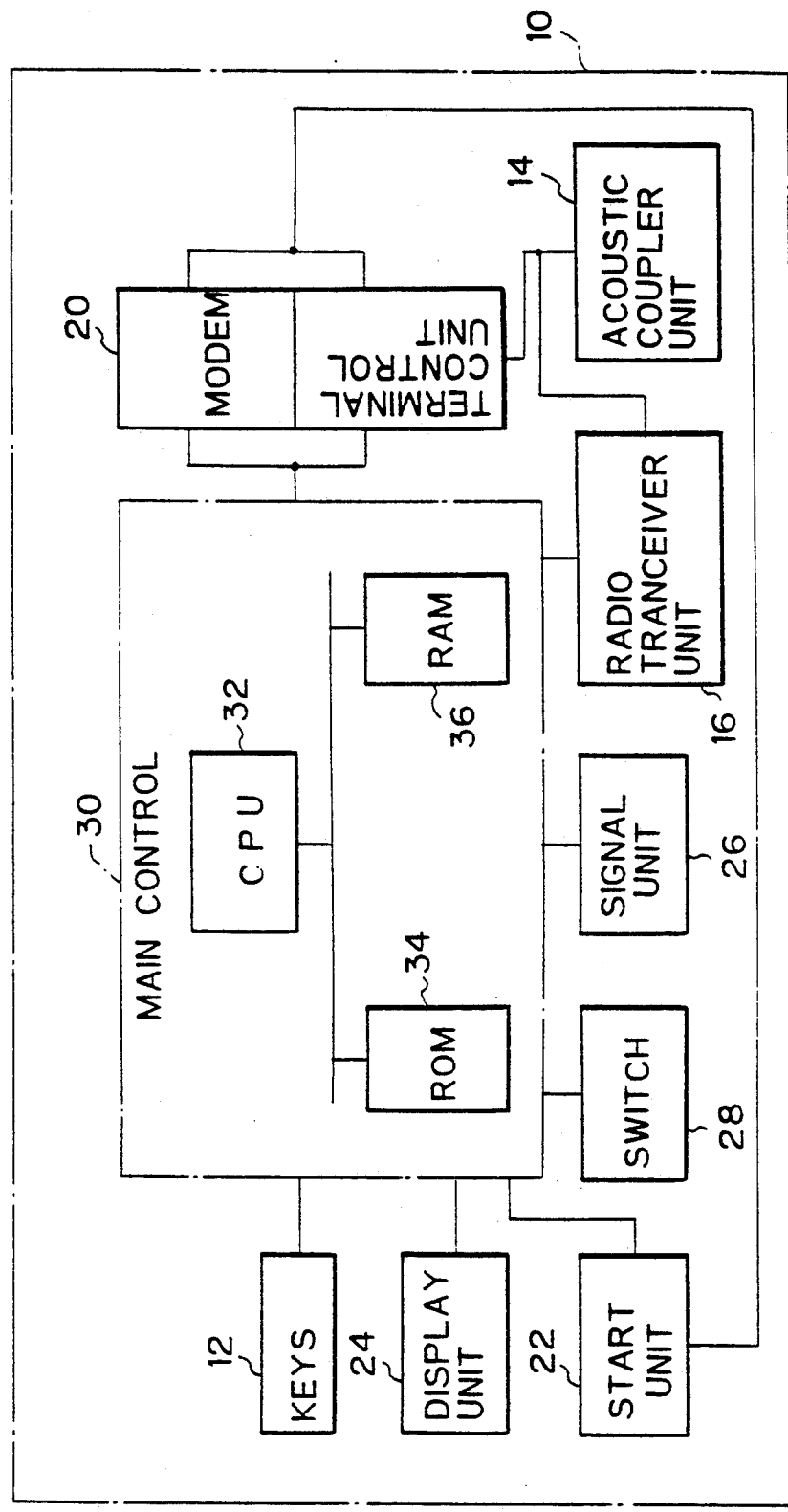
FIG. 1 is a block diagram schematically showing a preferred embodiment of the mobile terminal equipment in accordance with the present invention.
Figure 2:
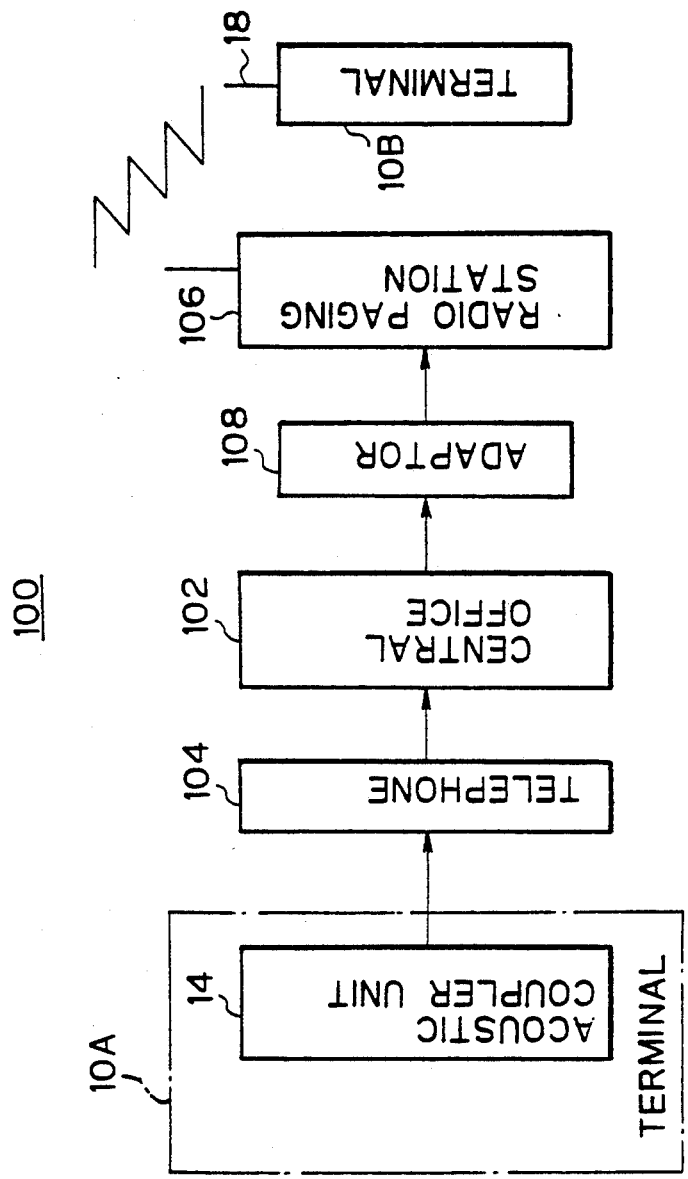
FIG. 2 schematically shows an embodiment of a radio paging system applicable to the terminal equipment shown in FIG. 1.

Referring to FIG. 1 of the drawings, mobile terminal equipment embodying the present invention is shown and generally designated by the reference numeral 10. As shown, the terminal equipment 10 has a plurality of keys 12 which may be operated to input information to be sent, data such as the number assigned to terminal equipment to be called, commands such as a call origination command, etc. The terminal equipment 10 is applicable to specific radio paging systems 100 and 120 shown in FIGS. 2 and 3, respectively. To this end, the terminal 10 has an acoustic coupler unit 14 and a radio transceiver unit 16. The acoustic coupler unit 14 has a transmitting and receiving function for acoustically connecting the terminal equipment 10 to a handset, not shown, of a telephone 104 which is connected to a central orifice 102 included in the system 100. The terminal equipment 10 may be adapted for a handy acoustic coupler independent of the equipment 10, if desired. In such a case, the terminal equipment 10 will be provided with an exclusive terminal for the connection thereof to an independent coupler. The transceiver unit 16 has an antenna 18. FIG. 2, for receiving an electromagnetic wave sent from a paging station 106 included in the system 100 or a radio base station 126 included in the system 120 and for sending an electromagnetic wave to the system 100 or 120.

A MODEM and terminal control unit, generally 20, is connected to the acoustic coupler unit 16 and transceiver unit 14. The MODEM and terminal control unit 20 serves two different functions, i.e., a function of demodulating received information and modulating information to be transmitted, and a function of interfacing the terminal 10 to a telephone channel for channel control. The unit 20 is connected to a start unit 22.

The start unit 22 plays the role of a transmitting circuit for transmitting information and control data via the acoustic coupler 14 and transceiver 14.

The terminal equipment 10 has a display unit 24 for displaying information entered on the keys 12 or information received from the system 100 or 120. Further, the terminal equipment 10 has a signal unit 26 which is an indicator for alerting the user of the terminal 10 to incoming calls, i.e., paging audibly and/or visibly by sound, vibration and/or light. A switch 28 is provided on the terminal equipment 10 and may be operated to inhibit the operation of the signal unit 26, as desired.

A main control 30 is incorporated in the terminal 10 for controlling the various functioning blocks stated above, The main control 30 is made up of a central processing unit (CPU) 32, a ROM 34, and a RAM 36 which are interconnected as illustrated so as to implement the control over the entire terminal equipment 10. The ROM 34 stores operation program sequences to be executed by the main control 30 and various kinds of fixed data. The RAM 36 serves as a temporary storage and is used as a working area. Specifically, the RAM 36 includes a storage area for temporarily storing various kinds of information such as communication information and paging indication information received from the system 100 as well as information entered on the keys 12 to be sent to the system 100.

Referring to FIG. 2, there are shown two terminals 10A and 10B each being identical in construction with the terminal equipment 10, FIG. 1. One terminal equipment 10A is connected to the central office or offices 102 by an acoustic coupler 102 thereof and the telephone 104. The other terminal equipment 10B is connected to the radio paging station 106 by the radio transceiver unit 16, FIG. 1. The central office 102 may be implemented as a central office of a public switched telephone network by way of example. The paging station 106 is connected to the central office 102 via an adapter 108. The paging station 106 is a fixed station and pages the terminal equipment 10B in response to a number or similar identification (ID) code assigned to the terminal 10B and received from the central office 102, sets up a communication channel, and then sends information to the equipment 10B.

In operation, the user of the terminal equipment 10A inputs on the keys 12 desired information meant for the remote terminal equipment 10B and the ID number assigned to the equipment 10B, while watching the display unit 24 for confirmation. Such information and ID number are written to the RAM 36 via the CPU 32. While any desired number of characters and numerals may be entered on the keys 12, it should preferably be limited up to about forty which can be accommodated on one line of a personal computer or similar data center.

Subsequently, the terminal equipment 10A is connected to the public switched telephone network via the acoustic coupler unit 14 and the telephone 104 located near the equipment 10A. When the terminal equipment 10A calls the central office 102, it is connected to the paging station 106 via the adapter 108. Then, the information having been stored in the RAM 23 is sent to the paging station 106. It is to be noted that this information includes the ID number assigned to the called terminal equipment 10B. On receiving the information from the terminal equipment 10A, the paging station 106 once returns it to the calling terminal equipment 10A for confirmation purpose. Thereafter, the paging station 106 sends the information received from the calling mobile station 10A to the called mobile station 10B on the basis of the ID number included in the information.

The called terminal equipment 10B receives the information from the paging station 106 by the transceiver unit 10 and writes it in the RAM 36. At the same time, the display unit 24 of the called station 10B displays the received information while the signal unit 26 alerts the user to the call incoming by sound, vibration and/or flashing light. The user may interrupt the sound, vibration and/or light being generated by the signal unit 26 by operating the switch 28. Since the information received from the paging station 106 is stored in the RAM 36, the user can read out and see the information on the display unit 24 any time after having intentionally disabled the alerting indication by operating the switch 28. The terminal equipment 10 is capable of storing a plurality of such incoming calls in the RAM 36 and, therefore, allows the user thereof to see the contents of the RAM 36 and either preserve them or erase them, as desired.

Figure 3:
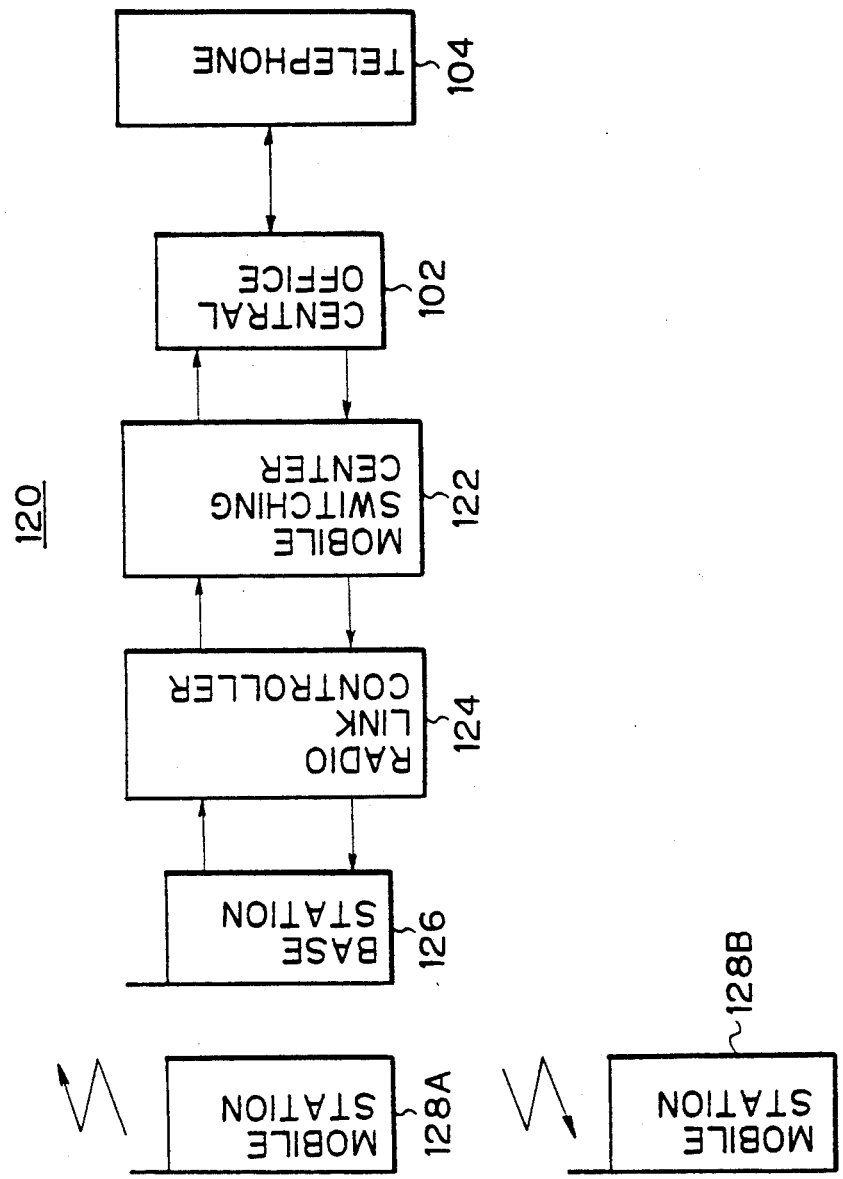
FIG. 3 schematically shows an alternative embodiment of the radio paging system applicable to the terminal equipment.

FIG. 3 shows an alternative radio paging system 120 to which the terminal equipment 10 is applicable. As shown, the central office 102 accommodates a mobile radio communication system therein. The mobile radio communication system is made up of a mobile switching center 122, a radio link controller 124, and a radio base station 126 which are connected together, as illustrated. In the illustrative embodiment, the radio base station 126 is communicable with mobile stations 128A and 128B. The mobile stations 128A and 128B each has the terminal equipment 10 and an on-board telephone, not shown, which is communicable with the base station 126. Of course, the mobile stations 128A and 128B each may be constructed to communicate with one or two radio base stations which are equivalent to the radio base station 126 and independent of each other. The system 120 allows the two mobile stations 128A and 128B to call and communicate with each other via the base station 126.

More specifically, when the mobile station 128A calls the remote mobile station 128B, the system 120 allows the person at the called station 128B to answer by operating the on-board telephone of the station 128B. Therefore, persons at the mobile stations 128A and 128B can communicate with each other by voice on the individual on-board telephones. Assume that the person at the called station 128B has not performed any answering operation over a predetermined period of time or has set up a non-answerable condition on the keys 12. Then, the mobile station 128B continuously generates a status signal representative of "NO ANSWER" so long as it is normally powered. This status signal is returned to the calling mobile station 128A via the base station 126. On receiving the status signal, the mobile station 128A sends the information and number to be transmitted to the called mobile station 128B to the radio link controller 124 over a radio channel. In response, the radio link controller 124 sends the received information to the mobile station 128B designated by the received number over a radio channel. Then, the called mobile station 128B writes the information in the RAM 36 of the terminal equipment 10 thereof and displays it on the display unit 24 afterwards. Preferably, an arrangement may be made such that the person at the calling mobile station 128A stores desired information and ID number meant for the called station in the RAM 36 on the keys 12 while confirming them on the display unit 24, and the start unit 22 sends the information and ID number over a radio channel on receiving the previously mentioned status signal.

In summary, it will be seen that the present invention provides a terminal equipment transmission and reception system which allows terminal equipment to call remote terminal equipment directly via a public switched telephone network and a radio paging station or a radio link controller and to transmit desired information to the remote equipment. Hence, one terminal equipment can call and send information to another terminal equipment any time at any place. For example, the user of terminal equipment can send information directly to a fixed center located at an office from the place where the user is.

The terminal equipment in accordance with the present invention has a RAM for storing information having been sent thereto. The stored information can be displayed on a display unit provided on the terminal equipment or held for a desired period of time, as the case may be. Even when the user of the terminal equipment intentionally interrupts sound, vibration and/or flashing light which a signal unit generates to alert the user to call incoming from a radio paging station, the call incoming is not disturbed at all.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, in the illustrative embodiments, the terminal equipment 10A calls the central station 102 via the acoustic coupler unit 14, and the call is terminated at the terminal equipment 10B from paging station 106 over a radio channel. Further, the calling mobile station 128A calls the central office 106 over a radio channel, and the call is terminated at the mobile station 128B over a radio channel. Alternatively, the terminal equipment 10 and the central office 102 may be linked by either a radio channel or a wire for both of call origination and call termination. If desired, the interconnection of the central office 102 and the terminal equipment 10 may be implemented by a metallic line in place of the acoustic coupler 14.

What is claimed is:

1. Mobile terminal equipment communicable with a public switched network, which includes a stationary radio station for establishing a radio channel to said equipment and switches information including a message to said equipment on the radio channel, said mobile terminal equipment comprising:

receiving means for receiving the information over the radio channel from the radio station;

storing means for storing the information received;

display means for visually displaying the message received;

control means interconnected to said receiving means, said storing means and said display means for controlling, in response to said receiving means receiving the information, said storing means to store the information and said display means to display the message included in the received information;

indicator means interconnected to said control means for indicating that the information has been received from the radio station in response to said receiving means receiving the information; and first input means for inputting a command for disabling said indicator means;

said control means controlling, in response to the command, said indicator means to inhibit said indicator means from indicating that the information has been received from the radio station, and controlling, in response to cancelling the command from said first input means, said storing means to read out the message from said storing means and said display means to display the message thus read out.

2. Equipment in accordance with claim 1, wherein said indicator means comprises audible indicator means for providing an audible indication representing that the information has been received from the radio station.

3. Equipment in accordance with claim 1, further comprising:

second input means interconnected to said control means for inputting a message to be transmitted to the switched network and identification (ID) information designating a called terminal device to which the message to be transmitted is meant to be sent; and transmitter means interconnected to said control means for transmitting the message to be transmitted and the ID information to the switched network;

said control means being responsive to said second input means to control said transmitter means to transmit the ID information and the message to be transmitted following the ID information.

4. Equipment in accordance with claim 3, wherein said transmitter means transmits the message to be transmitted when connected to the terminal device designated by the ID information through the switched network.

5. Equipment in accordance with claim 3, further comprising indicator means interconnected to said control means for producing a failure indication representing that the switched network has failed to connect said equipment to the terminal device; and additional receiving means interconnected to said control means for receiving from the switched network failure information indicating that the switched network has failed to connect said equipment to the terminal device;

said control means controlling, when said additional receiving means receives the failure information from the switched network, said indicator means to produce the failure indication.

6. Equipment in accordance with claim 3, wherein said control means controls said storing means to store the message to be transmitted and the ID information inputted on said second input means.

7. Equipment in accordance with claim 3, wherein said control means controls said display means to visually display the message to be transmitted and the ID information inputted on said second input means.

8. Equipment in accordance with claim 5, wherein said indicator means comprises visual indicator means for producing a visual indication representative of the failure information.

9. Equipment in accordance with claim 3, wherein the switched network comprises a telephone subscriber set, said transmitter means comprising acoutic coupling means for setting up an acoustic connection to the telephone subscriber set.

10. Equipment in accordance with claim 5, wherein the switched network comprises a telephone subscriber set, said transmitter means and said additional receiving means comprising acoustic coupling means for setting up an acoustic connection to the telephone subscriber set.

11. Equipment in accordance with claim 3, wherein said transmitter means comprises radio transmitter means for transmitting the message to be transmitted and the ID information over the radio channel to the radio station.

12. Mobile terminal equipment communicable with a public switched network, which includes a stationary radio station for establishing a radio channel to said equipment and switches information including a message to said equipment on the radio channel, said mobile terminal equipment comprising:

input means for inputting a message to be transmitted to the switched network and identification (ID) information designating a called terminal device to which the message to be transmitted is meant to be sent;

transmitter means for transmitting the message to be transmitted and the ID information to the switched network;

receiving means for receiving the switched information over the radio channel from the radio station;

storing means for storing the message to be transmitted and the information received;

display means for visually displaying the message to be transmitted and the information received; and control means interconnected to said input means, said transmitter means, said receiving means, said storing means and said display means for controlling, in response to said input means, said transmitter means to transmit the ID information and the message to be transmitted, and further controlling, in response to said receiving means receiving the switched information, said storing means to store the received information and said display means to display the message which is included in the received information;

said control means controlling, in response to said receiving means receiving from the switched network failure information indicating that the switched network has failed to connect said equipment to the terminal device, said transmitter means to transmit the ID information and the message to be transmitted following the ID information.

13. Equipment in accordance with claim 12, further comprising indicator means interconnected to said control means for producing a failure indication representing that the switched network has failed to connect said equipment to the terminal device;

said control means controlling, in response to said receiving means receiving the failure information, said indicator means to produce the failure indication.

14. Equipment in accordance with claim 12, wherein said control means controls said storing means to store the ID information together with the message to be transmitted which are entered on said input means.

15. Equipment in accordance with claim 13, wherein said indicator means comprises visual indicator means for producing a visual indication representative of the failure information.

16. Equipment in accordance with claim 12, wherein the switched network comprises a telephone subscriber set,
   said transmitter means comprising acoustic coupling means for setting up an acoustic connection to the telephone subscriber set.

17. Equipment in accordance with claim 12, wherein the switched network comprises a telephone subscriber set,
   said transmitter means and said receiving means comprising acoustic coupling means for setting up an acoustic connection to the telephone subscriber set.

18. Equipment in accordance with claim 12, wherein said transmitter means comprises radio transmitter means for transmitting the message to be transmitted and the ID information over the radio channel to the radio station.

19. A mobile communication method for communicating with mobile terminal equipment via a public switched network, comprising the steps of:
   providing first mobile terminal equipment;
   inputting in the first mobile terminal equipment a message to be transmitted and identification (ID) information designating second mobile terminal equipment;
   transmitting the message to be transmitted and the ID information from the first mobile terminal equipment to the public switched network;
   calling a second mobile terminal equipment via the public switched network on the basis of the ID information;
   transmitting the message to be transmitted via the public switched network to the second mobile terminal equipment;
   storing the message transmitted from the public switched network in storing means included in the second mobile terminal equipment; and
   displaying visually the message received from the public switched network on visual display means included in the second mobile terminal equipment.

20. A mobile communication method of communicating with mobile terminal equipment via a public telephone switched network, comprising the steps of:
   providing first mobile terminal equipment;
   providing a mobile telephone to be interconnected to the first mobile terminal equipment;
   inputting in the first mobile terminal equipment a message to be transmitted and identification (ID) information designating second mobile terminal equipment;
   originating a call meant for the second mobile terminal equipment on the mobile telephone to the public telephone switched network;
   transmitting, upon receiving from the public telephone switched network failure information indicating that the public telephone switched network has failed to connect the first terminal equipment to the second terminal equipment, the message to be transmitted and the ID information from the first mobile terminal equipment to the public telephone switched network;
   calling the second mobile terminal equipment by the public telephone switched network on the basis of the ID information;
   sending the message to be transmitted from the public telephone switched network to the second mobile terminal equipment;
   storing the message transmitted from the public telephone switched network in storing means included in the second mobile terminal equipment; and
   displaying visually the message received from the public telephone switched network on visual display means included in the second mobile terminal equipment.

21. Method in accordance with claim 20, further comprising the steps of:
   producing a status signal representing that the second mobile terminal equipment is in a condition in which the second mobile terminal equipment is not responsive to a call transmitted from the switched network, when the second mobile terminal equipment is called from the switched network while the second mobile terminal equipment is in the condition; and
   transmitting the failure information from the switched network to the first mobile terminal equipment upon receiving the status signal from the second mobile terminal equipment.

22. Method in accordance with claim 21, further comprising the step of setting the second mobile terminal equipment to produce the status signal.

23. Equipment in accordance with claim 12, wherein said control means produces a status signal representing that said equipment is in a condition in which said equipment is not responsive to a call transmitted from the switched network, said transmitter means transmitting the status signal to the switched network upon receiving a call from the switched network while said equipment is in the condition.

24. Equipment in accordance with claim 23, wherein said input means is adapted to input a command for instructing the status signal to be produced, said control means producing the status signal in response to the command.

* * * * *